United States Patent
Reche et al.

(10) Patent No.: US 10,162,526 B2
(45) Date of Patent: Dec. 25, 2018

(54) LOGICAL ADDRESS HISTORY MANAGEMENT IN MEMORY DEVICE

(71) Applicant: Micron Technology, Inc., Boise, ID (US)

(72) Inventors: Cory J Reche, Boise, ID (US); Phil W. Lee, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 14/887,951

(22) Filed: Oct. 20, 2015

(65) Prior Publication Data

US 2017/0109084 A1 Apr. 20, 2017

(51) Int. Cl.
G06F 12/00 (2006.01)
G06F 3/06 (2006.01)

(52) U.S. Cl.
CPC ............ *G06F 3/0605* (2013.01); *G06F 3/064* (2013.01); *G06F 3/0679* (2013.01)

(58) Field of Classification Search
None
See application file for complete search history.

(56) References Cited

U.S. PATENT DOCUMENTS

| 7,100,072 | B2 | 8/2006 | Galipeau et al. |
| 8,793,429 | B1 | 7/2014 | Call et al. |
| 2009/0150599 | A1 | 6/2009 | Bennett |
| 2013/0166820 | A1 | 6/2013 | Batwara et al. |
| 2013/0282673 | A1 | 10/2013 | Fiske et al. |
| 2014/0013053 | A1* | 1/2014 | Sawin ............... G06F 12/0873 711/122 |
| 2014/0075096 | A1* | 3/2014 | Tanaka ............... G06F 12/0246 711/103 |
| 2014/0089264 | A1* | 3/2014 | Talagala ............ G06F 11/1471 707/649 |
| 2014/0325123 | A1* | 10/2014 | Higeta ............... G06F 12/0246 711/103 |
| 2016/0283160 | A1* | 9/2016 | Trika .................. G06F 3/0638 |
| 2017/0242790 | A1* | 8/2017 | O'Krafka ............ G06F 3/0604 |

FOREIGN PATENT DOCUMENTS

| TW | 201539455 A | 10/2015 |
| TW | 201725514 A | 8/2017 |
| WO | WO-2017070001 A1 | 4/2017 |

OTHER PUBLICATIONS

"International Application Serial No. PCT/US2016/056854, International Search Report dated Jan. 10, 2017", 5 pgs.

(Continued)

*Primary Examiner* — Baboucarr Faal
(74) *Attorney, Agent, or Firm* — Schwegman Lundberg & Woessner, P.A.

(57) ABSTRACT

Some embodiments include apparatuses and methods including memory cells and a control unit to store information in a portion of the memory cells and to generate an entry associated with the information. The information is associated with a logical address recognized by a host. The entry includes an indicator indicating that the information is to be preserved for a creation of an image of information associated with logical addresses in a logical address space recognized by the host.

11 Claims, 7 Drawing Sheets

(56) References Cited

OTHER PUBLICATIONS

"International Application Serial No. PCT/US2016/056854, Written Opinion dated Jan. 10, 2017", 13 pgs.
"Taiwanese Application Serial No. 105132653, Office Action dated Aug. 10, 2017", w/ English Translation and Claims, 19 pgs.
"Taiwanese Application Serial No. 105132653, Response filed Nov. 14, 2017 to Office Action dated Aug. 10, 2017", w/English Claims, 35 pgs.

* cited by examiner

LOGICAL ADDRESS HISTORY MANAGEMENT IN MEMORY DEVICE

BACKGROUND

Many electronic systems, such as desktop and laptop computers, servers, data storage system, and other electronic devices or systems, have memory to store information (e.g., data). Some conventional systems may include techniques to capture certain information stored in a memory device at a particular time. Some of these techniques, however, may be time consuming, may employ complicated information management, or both.

DETAILED DESCRIPTION

Figure 1:
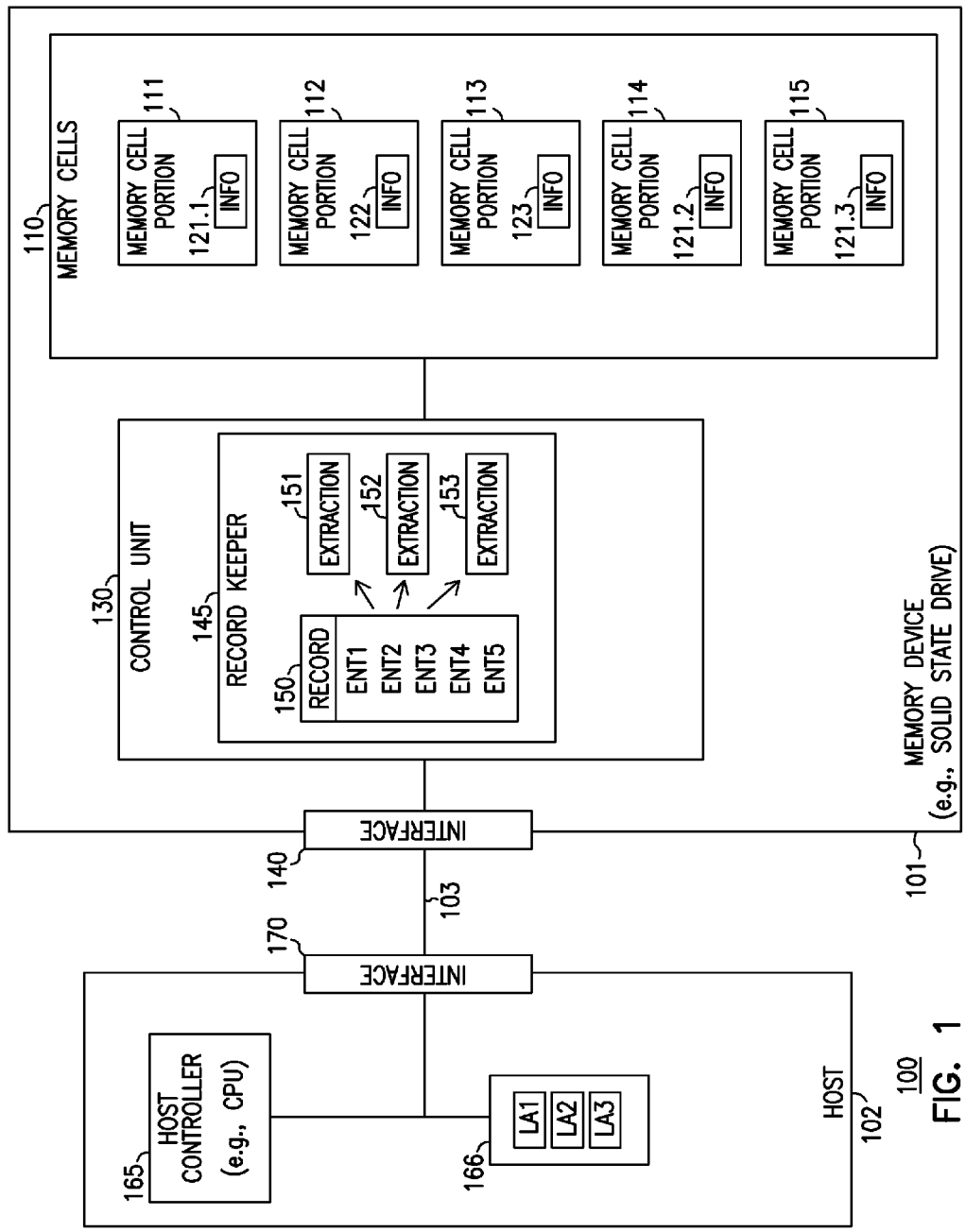
FIG. 1 shows a block diagram of an apparatus including a memory device, a host, and a connection, according to some embodiments described herein.

FIG. 1 is a block diagram of an apparatus 100 including a memory device 101, a host 102, and a connection 103, according to some embodiments described herein. Apparatus 100 can include or be included in a computer, a memory storage system, or other types of electronic systems.

As shown in FIG. 1, memory device 101 can include memory cells 110, a control unit 130, and an interface 140. Memory cells 110 can be included in (e.g., formed in or formed on) a single die or multiple dice. The die can be included in a chip (e.g., a semiconductor chip). Memory cells 110 can include non-volatile memory cells. Examples of non-volatile memory cells include flash memory cells or other types of non-volatile memory cells. Memory cells 110 can be arranged in a NAND-type (e.g., NAND flash) memory arrangement. Each of memory cells 110 can store one bit or multiple bits of information. Control unit 130 can be included in a die separated from the die (or dice) where memory cells 110 are included. Alternatively, part of control unit 130 or the entire control unit 130 can be included in (e.g., in the same die with) memory device 101. Memory device 101 can include a solid state drive (SSD). Thus, memory cells 110, control unit 130, and interface 140 can be part of an SSD. One of ordinary skill in the art may recognize that a memory device (e.g., an SSD) such as memory device 101 may include other elements, several of which are not shown in FIG. 1, so as not to obscure the example embodiments described herein.

Host 102 can include a host controller 165 and an interface (e.g., host interface) 170. Host controller 165 can include a central processing unit (CPU) that can perform operations such as processing information (e.g., data) used in apparatus 100. Host 102 may use host controller 165 to communicate with memory device 101 to store information in memory device 101. One of ordinary skill in the art may recognize that a host in a system (e.g., computer system, memory storage system, or other systems) such as host 102 may include other elements, several of which are not shown in FIG. 1, so as not to obscure the example embodiments described herein. Host 102 and memory device 101 can communicate (e.g., exchange information) with each other through connection 103.

Connection 103 can include conductive traces (e.g., a bus) on a circuit board (e.g., motherboard), a wire (e.g., metal) cable, optical fibers, any combination of these connections, or other types of connections. Each of interfaces 140 and 170 can include components (e.g., connectors and circuitry) that comply with Peripheral Component Interconnect Express (PCIe) specification, Serial Advanced Technology Attachment (SATA) specification, Serial Attached Small Computer System Interface (SAS) specification, InfiniBand specification, Ethernet specification, Fibre Channel specification, or other specifications. Thus, each of interfaces 140 and 170 may include a connector having a form factor (e.g., physical dimension and conductive terminals) complying with PCIe, SATA, SAS, InfiniBand, Ethernet (e.g., 10 G/40 G/100 G Ethernet), Fibre Channel, or other specifications.

As shown in FIG. 1, host 102 can include a logical address space 166, which can include different logical addresses, such as logical addresses LA1, LA2, and LA3. Each of logical addresses LA1, LA2, and LA3 can include a logical block address (LBA). FIG. 1 shows an example of three logical addresses LA1, LA2, and LA3 in logical address space 166. The number of logical addresses in logical address space 166 may vary. Host 102 may be associated with (e.g., or may include) an operating system (OS) that may also recognize logical address space 166 used by host 102.

Host 102 can store information at logical addresses (e.g., logical locations) in logical address space 166. Each of logical addresses LA1, LA2, and LA3 can be linked (e.g., mapped) to a physical address (e.g., a physical location) where information (e.g., host data) used by host 102 is actually (e.g., physically) stored. For example, as described in more detail below, each of logical addresses LA1, LA2, and LA3 can be linked a particular physical address in memory cells 110 of memory device 101 where information can be stored in a particular portion of memory cells 110 associated with that particular physical address.

Memory device 101 can store information in different portions (memory cell portions) of memory cells 110 during a write (e.g., program) operation. For example, as shown in FIG. 1, memory device 101 can store information (INFO) 121.1, 122, 123, 121.2, and 121.3 in portions 111, 112, 113, 114, and 115, respectively. Information 121.1, 122, 123, 121.2, and 121.3 can include user information and can be stored in memory cells 110 at different times (e.g., different days or the same day but at different times of the day). As an example, information 121.1, 122, and 123 may be stored in portions 111, 112, and 113 during the same time frame (e.g., a same day). Then (e.g., a next day), information 121.2 may be stored in portion 114 after information 121.1, 122, and 123 are stored. Subsequently, information 121.3 may be stored after information 121.2 is stored (e.g., stored after an hour, a day, or days after information 121.2 is stored).

Information 121.1, 122, 123, 121.2, and 121.3 may include different contents. For example, information 121, 122, and 123 can include three files having different contents. Information 121.1, 121.2, and 121.3 may include different versions of the same element (e.g., document, file, or other information). For example, information 121.1 may include an original version of a file, information 121.2 may include an updated (e.g., revised) version of the file in information 121.1, and information 121.3 may include an updated (e.g., revised) version of the file in information 121.2 (e.g., information 121.3 may include a further updated version of the file in information 121.1). Thus, in this example, the same file may have three different versions stored at three different portions (e.g., 111, 114, and 115) in memory cells 110. Alternatively, information 121.1, 121.2, and 121.3 may include contents that are different from among each other. For example, information 121.1, 121.2, and 121.3 may include three files having different contents.

Each of portions 111 through 115 includes a number of memory cells among memory cells 110. The number of memory cells in each portion can be the same or different. Memory cells 110 can be organized in memory cell blocks (not shown). The blocks can have the same number (quantity) of memory cells or different numbers of memory cells. Portions 111 through 115 can be included in the same block or in different blocks. Each of memory cells 110 has a unique physical address. The location of each of memory cells 110 can be identified (e.g., located) by its physical address. A particular portion among portions 111 through 115 can be identified by a physical address associated with that particular portion.

As shown FIG. 1, control unit 130 can include a record keeper 145 to keep track of the locations (e.g., portions 111 through 115) in memory cells 110 where information is stored. A portion of control unit 130 (e.g., at least some or all of the operations of control unit 130) can be implemented by software, firmware, hardware, or any combination of software, firmware, and hardware. Thus, record keeper 145 can also be implemented by software, firmware, hardware, or any combination of software, firmware, and hardware.

FIG. 1 shows an example where record keeper 145 is located in control unit 130 of memory device 101. In an alternative arrangement, part of record keeper 145 or the entire record keeper 145 can be located in host 102. In another alternative arrangement, record keeper 145 may be shared by memory device 101 and host 102, such that both memory device 101 and host 102 can have knowledge of the content of record keeper 145 and can access record keeper 145 in order to read or change (or both) content of record keeper 145. In some arrangements, record keeper 145 can include a media management component or can be part of such media management component of apparatus 100 (e.g., a media management component of memory device 101, host 102, or both). Such a media management component can manage information stored in or retrieved from memory cells 110. An example of such a media management component includes a flash translation layer (FTL). Thus, in some arrangement, record keeper 145 can include an FTL or can be part of such an FTL.

Control unit 130 may exchange information with host 102 in chunks (e.g., a number of bits of information) associated with a logical address (e.g., LA1, LA2, or LA3) recognized by control unit 130 and host 102. Logical addresses (e.g., LA1, LA2, and LA3) known to host 102 and control unit 130 may be different from the physical addresses of memory cells 110. For example, as described above, host 102 may store information (e.g., host data) in logical address space 166 and access the information based on logical addresses, such as logical addresses LA1, LA2, and LA3. Control unit 130, however, may store information (e.g., host data) in memory cells 110, which are physical locations. Control unit 130 can access stored information based on physical addresses of memory cells 110. The locations (e.g., portions 111 through 115) of memory cells 110 where control unit 130 stores information may be known or unknown to host 102.

As shown in FIG. 1, record keeper 145 can include a record (e.g., a table) 150, which can contain information generated by control unit 130, such information can include entries (e.g., indices), such as entries ENT1 through ENT5, generated by control unit 130. FIG. 1 shows record 150 including five entries ENT1 through ENT5 as an example. The number of entries may vary. For example, number of entries in record may be proportional to the number of portions in memory cells 110 that have information stored therein.

Control unit 130 can generate an entry (e.g., one of entries ENT1 through ENT5) each time information is stored in memory cells 110. Each of entries ENT1 through ENT5 can include information (e.g., data content) indicating a link (e.g., a mapping) between a logical address and a physical address (e.g., a location) of portions in memory cells 110 where information associated with the logical address is stored. As described above, host 102 may store information (e.g., host data) in logical address space 166 in host 102, whereas control unit 130 may store information in physical locations (e.g., portions 111 through 115) in memory cells 110. The link information (e.g., mapping information) contained in entries ENT1 through ENT5 in record 150 allows control unit 130 to access a particular portion among portions 111 through 115 based on the logical address associated with (e.g., linked to) the physical address of that particular portion.

Each of entries ENT1 through ENT5 can include other additional information generated by control unit 130 besides the link between logical addresses and physical addresses. As described in more detail below, such additional information and the links contained in ENT1 through ENT5 may allow control unit 130 to create an image (e.g., a snapshot) of information associated with particular logical addresses (e.g., a logical address range) that may exist in memory cells 110 at a particular time (e.g., a particular moment). Such an image of information can include host data at a particular time. Host data at a particular time includes data existed in (e.g., stored in) logical address space 166 of host 102 at that particular time. Host data at one time may be different from host data at another time. Host data at a particular time in the past may also be different from information stored currently stored in memory cells 110. The logical addresses used to create an image of information may include part of logical address space 166 of host 102 or may include the entirety of logical address space 166.

Based on the content of record 150, control unit 130 can have the capability to create different images of information associated with particular logical addresses existed at different points in time. This capability enables memory device 101 to capture historical information (e.g., historical host data) stored in memory device 101. Such historical information may be useful for operations such as recovering information (e.g., recovering an old version of a file), replaying information (e.g., replaying an audio or video file), tracking stored information, and other operations.

In FIG. 1, control unit 130 can selectively extract (e.g., copy) some of the entries among entries ENT1 through ENT5 based on logical addresses (e.g., LA1, LA2, and LA3 provided by host 102) to create an image of information stored in memory cells 110 at a particular time. FIG. 1 shows an example where control unit 130 may extract information from record 150 to generate three extractions 151, 152, and 153. Control unit 130 may generate extractions 151, 152, and 153 based on three requests from host 102 at three different times. Host controller 165 of host 102 may send a command (e.g., command to create a snapshot) to control unit 130 each time host 102 requests an image of information to be created. In response to such a command, control unit 130 can generate an extraction (e.g., extraction 151, 152, or 153) to create the requested image of information.

Extractions 151, 152, and 153 can include different contents. For example, each of extractions 151, 152, and 153 can include a different combination of entries ENT1 through ENT5. Since entries ENT1 through ENT5 can include different contents associated with different information stored in different portions of memory cells 110, extractions 151, 152, and 153 can provide different images (e.g., different snapshots) of information (e.g., host data) associated with logical addresses (e.g., used by host 102) existed at three different points in time. The image of information associated with each of extractions 151, 152, and 153 includes information from fewer than all of portions 111 through 115.

Figure 2A:
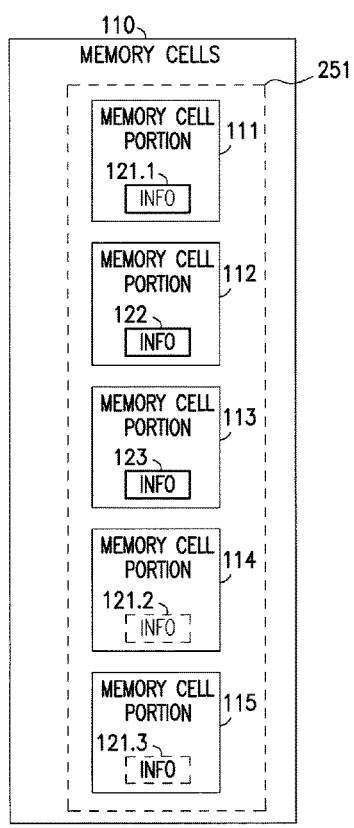
FIG. 2A shows an image of information stored in memory cells of the memory device of FIG. 1, according to some embodiments described herein.

FIG. 2A shows an image 251 of information stored in memory cells 110 of FIG. 1, according to some embodiments described herein. As shown in FIG. 2A, image 251 can include information 121.1, 122, and 123 stored in corresponding portions 111, 112, and 113. Information 121.1, 122, and 123 can include host data stored in logical address space 166 of host 102 at a particular time (e.g., in the past) before other information (e.g., information 121.2 and 121.3) is stored in memory cells 110. Thus, although memory cells 110 in FIG. 1 may include information 121.1, 122, 123, 121.2, and 121.3 stored (e.g., currently existing) in portions 111, 112, 113, 114, and 115, respectively, image 251 in the example of FIG. 2A may include only part of information currently stored in memory cells 110 (e.g., information 121.1, 122, and 123) and exclude some other information stored in memory cells 110 (e.g., information 121.2 and 121.3).

The information contained in image 251 can be based on a particular extraction (e.g., one of extractions 151, 152, and 153) generated by control unit 130. For example, image 251 can be created based on information in extraction 151 of FIG. 1.

Figure 2B:
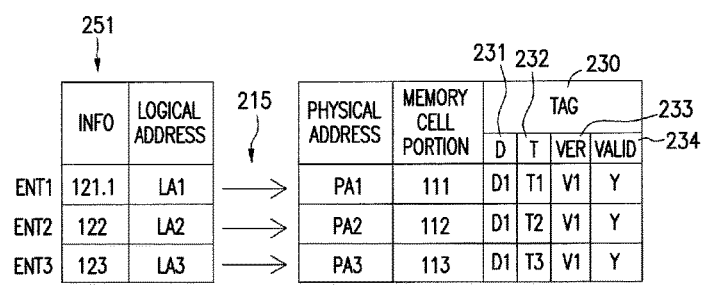
FIG. 2B shows information that may be contained in an extraction used to create the image of the information of FIG. 2A, according to some embodiments described herein.

FIG. 2B shows information that may be contained in extraction 151 of FIG. 1, according to some embodiments described herein. As shown in FIG. 2B, extraction 151 can include entries ENT1, ENT2, and ENT3 which can be extracted (e.g., copied) from record (e.g., table) 150 of FIG. 1 as described above with reference to FIG. 1. The section of which entries among entries ENT1 through ENT5 of record 150 to be extracted can be based on logical addresses (e.g., a logical address range) provided by host 102. FIG. 2B shows extraction 151 including three entries ENT1, ENT2, and ENT3 associated with three corresponding logical addresses LA1, LA2, and LA3 as an example. The number of entries in extraction 151 may vary depending on logical addresses used to create an image associated with such logical addresses.

As shown in FIG. 2B, entries ENT1, ENT2, and ENT3 can include a link (e.g., a mapping) 215. Link 215 can indicate a mapping (shown by an arrow) between a particular logical address (LA) used by host 102 and a particular physical address (PA) used by control unit 130 associated with the same information at a particular point in time. For example, information 121.1, 122, and 123 may be known to host 102 as being stored in logical locations (e.g., in logical address space 166 of host 102) associated with logical addresses LA1, LA2, and LA3, respectively. However, information 121.1, 122, and 123 may be known to control unit 130 as being stored in portions 111, 112, and 113 associated with physical addresses PA1, PA2, and PA3, respectively. During an operation (e.g., read or write operation) to access memory cells 110, based on link 215, control unit 130 can translate a logical address (e.g., LA1, LA2, or LA3) provided by host 102 into a physical address (PA2, PA2, or PA3), so that it can access memory cells 110 at the physical address linked by the logical address (which can be provided by host 102 during that operation).

As shown in FIG. 2B, each of entries of record 150 can include a tag 230. Different entries have different tags. As mention above, besides a link between a logical address and a physical address, each of entries ENT1 through ENT5 in record 150 (FIG. 1) can include additional information that may allow control unit 130 to create an image (e.g., image 251 in FIG. 2A and FIG. 2B) of information associated with a particular logical address at a particular point in time. In FIG. 2B, for example, tag 230 can include indicators 231 (D) and 232 (T) to indicate a date and time, respectively, that a particular information is stored, an indicator 233 (VER) to indicate a version of a particular information, and an indicator 234 (VALID) to indicate whether a particular information stored in memory cells 110 is valid or invalid. Indicators 231, 232, 233, and 234 can include values D1, T1, T2, V1, and Y. FIG. 2B uses letters and decimal numbers to represent the values contained in indicators 231, 232, 233, and 234 as an example. The values contained in indicators 231, 232, 233, and 234 may be presented by binary numbers (binary "0" and binary "1") or other types of presentation.

Based on the values contained in indicators 231, 232, 233, and 234 of tag 230 of each of entries ENT1, ENT2, and ENT3, control unit 130 can determine certain characteristics about information associated with entries ENT1, ENT2, and ENT3. For example, values D1, T1, T2, V1, and Y in FIG. 2B may allow control unit 130 to determine that information 121.1, 122, and 123 were stored in memory cells 110 on the same date (e.g., as indicated by the same value D1) at different times (e.g., as indicated by different time values T1, T2, and T3). Control unit 130 can determine that each of information 121.1, 122, and 123 has a version indicated by value V1 (e.g., version 1). Indicator 234 of tag 230 can have a value (e.g., Y) to indicate that information associated a particular entry is valid and another value (e.g., N) to indicate that information associated a particular entry is invalid. Thus, in the example of FIG. 2B, control unit 130 can also determine that each of information 121.1, 122, and 123 is valid (e.g., based on value Y). Valid information is preserved. Control unit 130 may create an image of information associated with particular logical addresses based on a collection of valid information.

Some of values among values D1, T1, T2, V1, and Y in tag 230 can be changed (e.g., updated). For example, as described above, value Y in tag 230 of each of entries ENT1, ENT2, and ENT3 can indicate that information stored in a particular portion is valid. However, in some situations, value Y can be changed to another value (e.g., N) to indicate that information stored in a particular portion is invalid. For example, if information 121.1 is no longer needed by host 102 and control unit 130, then value Y (e.g., or binary 1) in indicator 234 of tag 230 of entry ENT1 can be changed to value N (e.g., or binary 0). The values in tag 230 can be changed by control unit 130, host 102 or both.

In memory device 101, if a particular information (e.g., information 121.1 and 121.2) is indicated as valid information, such particular information is preserved. This means that valid information is not marked to be deleted (e.g., erased) from memory cells 110 until that particular information is indicated as invalid. Preserving different information (e.g., 121.1 and 121.2) associated with the same logical address (e.g., LA1) may allow control unit 130 to capture (e.g., reproduce) historical information existed at different points in time.

Figures 3A, 3B:
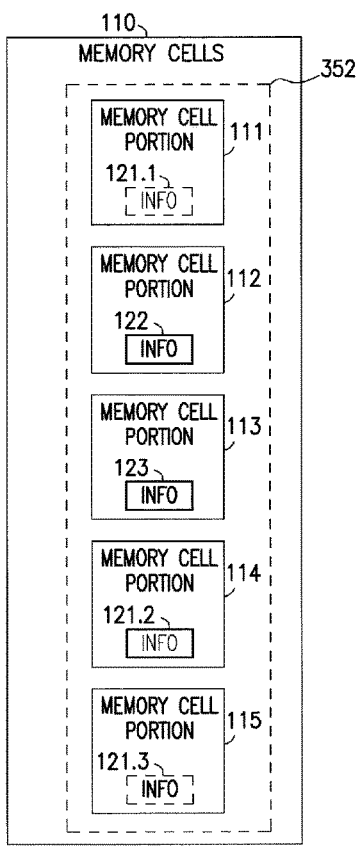
FIG. 3A shows another image of information stored in memory cells of the memory device of FIG. 1, according to some embodiments described herein.
FIG. 3B shows information that may be contained in an extraction used to create the image of information of FIG. 3A, according to some embodiments described herein.

FIG. 3A shows an image 352 of information stored in memory cells 110 of FIG. 1, according to some embodiments described herein. As shown in FIG. 3A, image 352 can include information 121.2, 122, and 123 stored in corresponding portions 111, 112, and 113. Information 121.2, 122, and 123 can include host data stored in logical address space 166 of host 102 at a particular time (e.g., in the past) before other information (e.g., information 121.3) is stored in memory cells 110. Thus, although memory cells 110 in FIG. 1 may include information 121.1, 122, 123, 121.2, and 121.3 stored (e.g., currently existed) in portions 111, 112, 113, 114, and 115, respectively, image 352 in the example of FIG. 3A may include only part of the information current stored in memory cells 110 (e.g., information 121.2, 122, and 123) and exclude some other information stored in memory cells 110 (e.g., information 121.1 and 121.3).

The information contained in image 352 can be based on a particular extraction generated by control unit 130 of FIG. 1, such as extraction 152. As shown in FIG. 3B, extraction 152 can include the same logical address LA1, LA2, and LA3 as extraction 151 of FIG. 2B. However, image 352 in FIG. 3A can include information different from the information included in image 251 of FIG. 2A. As shown in FIG. 3A, image 352 can include information 121.2, 122, and 123, whereas image 251 of FIG. 2A includes different information 121.1, 122, and 123. This situation may occur when host 102 replaces (e.g., updates) information 121.1 (e.g., old information) stored at logical address LA1 in logical address space 166 in host 102 with information (e.g., updated information) 121.2.

Although host 102 may replace information 121.1 with information 121.2 associated with logical address LA1, control unit 130 may not replace (e.g., may not override) information 121.1 stored at portion 111 associated with logical address LA1 with information 121.2. Instead, control unit 130 may store information 121.2 at portion 114 (which is different from portion 111) and then update the link associated with logical address LA1, so that logical address LA1 can be linked to the physical address (e.g., PA4) of portion 114 that store information 121.2. Thus, in this example, control unit 130 may update link 215 (FIG. 2B) with a link 315 (FIG. 3B), such that logical address LA1 associated image 352 (FIG. 3B) can be linked to physical address PA4.

Thus, in the example shown in FIG. 2B and FIG. 3B, logical address LA1 can be associated with two different information 121.1 and 121.2 in which information 121.2 can be considered as current information (e.g., current host data of host 102) associated with logical address LA1 and information 121.1 can be considered as historical information (e.g., old version of information 121.2) associated with logical address LA1. Therefore, image 352 (FIG. 3A and FIG. 3B) may include current information (e.g., 121.2, 122, and 123) associated with logical addresses LA1, LA2, and LA3, whereas image 251 (FIG. 2A and FIG. 2B) may include historical information (e.g., 121.1, 122, and 123) associated with logical addresses LA1, LA2, and LA3.

As shown in FIG. 3B, extraction 152 can include entries ENT2, ENT3, and ENT4. FIG. 3B shows extraction 152 including three entries ENT2, ENT3, and ENT4 associated with three corresponding logical addresses LA1, LA2, and LA3 as an example. The number of entries in extraction 152 may vary depending on logical addresses used to create an image associated with such logical addresses.

Extraction 152 has the same entries ENT2 and ENT3 as extraction 151 (FIG. 2B) because information associated with logical addresses LA2 and LA3 may remain unchanged (e.g., information 122 and 123 have not been replaced by host 102). Entry ENT4 in extraction 152 is associated with information 121.2. Since information 121.2 is different from information 121.1, some of the values (e.g., D2, T4, and V2) in tag 230 of entry ENT4 may be different from those (e.g., D1, T1, and V1) of tag 230 of entry ENT1 (FIG. 2B). The value of indicator (VALID) in both images 251 and 352 may be Y, indicating that both information 121.1 and 12.2 are valid.

Figures 4A, 4B:
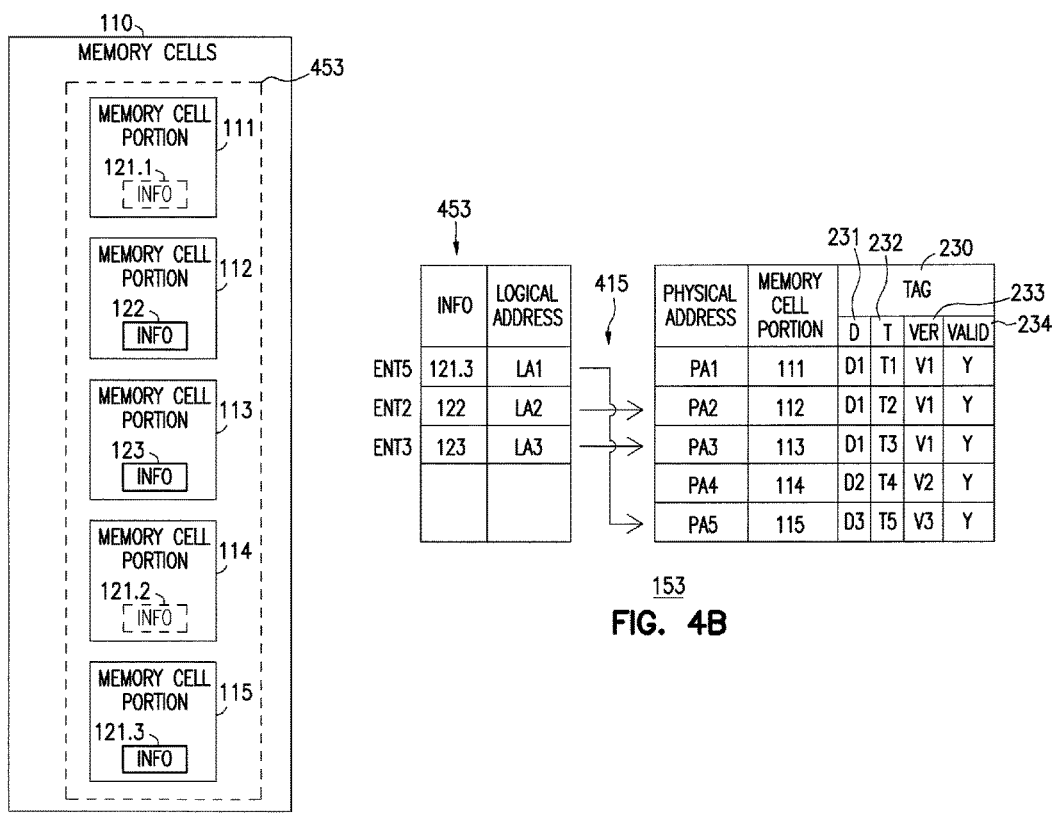
FIG. 4A shows another image of information stored in memory cells of the memory device of FIG. 1, according to some embodiments described herein.
FIG. 4B shows information that may be contained in an extraction used to create the image of information of FIG. 4A, according to some embodiments described herein.

FIG. 4A shows an image 453 of information stored in memory cells 110 of FIG. 1, according to some embodiments described herein. As shown in FIG. 4A, image 453 can include information 121.3, 122, and 123 stored in corresponding portions 111, 112, and 113. Information 121.3, 122, and 123 can include host data (e.g., current host data) stored in logical address space 166 of host 102 at a particular time. Although memory cells 110 in FIG. 1 may include information 121.1, 122, 123, 121.2, and 121.3 stored (e.g., currently existed) in portions 111, 112, 113, 114, and 115, respectively, image 453 in the example of FIG. 4A may include only part of the information current stored in memory cells 110 (e.g., information 121.3, 122, and 123) and exclude some other information stored in memory cells 110 (e.g., information 121.1 and 121.2). In comparison with image 251 (FIG. 2A) and image 352 (FIG. 3A), image 453 in FIG. 4A may be considered a current version (e.g., up-to-date version) of the information (e.g., host data) associated with particular logical addresses (e.g., LA1, LA2, and LA3). Image 251 (FIG. 2A) and image 352 (FIG. 3A) may be considered as two different historical versions (e.g., old versions) of the information (e.g., host data) associated with particular logical addresses (e.g., LA1, LA2, and LA3) at different points in time.

The information contained in image 453 can be based on a particular extraction generated by control unit 130 of FIG. 1, such as extraction 153. As shown in FIG. 4B, extraction 153 can include the same logical address LA1, LA2, and LA3 as extraction 151 (FIG. 2B) and extraction 152 (FIG. 3B). However, image 453 in FIG. 4A can include information different from the information included in image 251. As shown in FIG. 4A, image 453 can include information 121.3, 122, and 123, whereas image 251 (FIG. 2A) includes information 121.1, 122, and 123 and image 352 (FIG. 3A) includes information 121.2, 122, and 123. This situation may occur when host 102 replaces (e.g., updates) information 121.2 (e.g., old information) stored at logical address LA1 in logical address space 166 in host 102 with information (e.g., updated information) 121.3.

Similar to the examples in FIG. 2B and FIG. 3B, although host 102 may replace information 121.2 with information 121.3 associated with logical address LA1, control unit 130 may not replace (e.g., may not override) information 121.2 stored at portion 114 associated with logical address LA1 with information 121.3. Instead, control unit 130 may store information 121.3 at portion 115 (which is different from portion 114) and then update the link associated with logical address LA1, so that logical address LA1 can be linked to the physical address (e.g., PA5) of portion 115 that stores information 121.3. In this example, control unit 130 may update link 315 (FIG. 3B) with a link 415 (FIG. 4B), such that logical address LA1 associated image 453 (FIG. 4B) is linked to physical address PA5.

Thus, in the examples shown in FIG. 2B, FIG. 3B, and FIG. 4B, logical address LA1 can be associated with three different information 121.1, 121.2, and 121.3, in which information 121.3 can be considered as current information (e.g., current host data of host 102) associated with logical address LA1, information 121.2 can be considered as historical information (e.g., old version of information 121.3) associated with logical address LA1 at a point in time, information 121.1 can be considered as historical information (e.g., an old version of information 121.2) associated with logical address LA1 at another point in time.

Therefore, image 453 (FIG. 4A and FIG. 4B) can include current information (e.g., 121.3, 122, and 123) associated with logical addresses LA1, LA2, and LA3, whereas image 352 (FIG. 3A and FIG. 3B) can include historical information (e.g., 121.2, 122, and 123) associated with logical addresses LA1, LA2, and LA3 at a point in time, and image 251 (FIG. 2A and FIG. 2B) can include historical information (e.g., 121.1, 122, and 123) associated with logical addresses LA1, LA2, and LA3 at another point in time.

As shown in FIG. 4B, extraction 153 can include entries ENT2, ENT3, and ENT5. FIG. 4B shows extraction 153 including three entries ENT2, ENT3, and ENT5 associated with three corresponding logical addresses LA1, LA2, and LA3 as an example. The number of entries in extraction 153 may vary depending on logical addresses used to create an image associated with such logical addresses.

As shown in FIG. 4B, extraction 153 has the same entries ENT2 and ENT3 as extraction 151 (FIG. 2B) and extraction 152 (FIG. 3B) because information associated with logical addresses LA2 and LA3 may remain unchanged (e.g., information 122 and 123 have not been replaced by host 102). Since information 121.3 is different from information 121.1 and information 121.2, some of the values (e.g., D3, T5, and V3) in tag 230 of entry ENT5 may be different from those (e.g., D1, T1, and V1) of tag 230 of entry ENT1 (FIG. 2B) and from those (e.g., D2, T4, and V2) of tag 230 of entry ENT4 (FIG. 3B). The value of indicator (VALID) in images 251, 352, and 453 may be Y, indicating that information 121.1, 121.2, and 121.3 are valid.

Managing information associated with logical addresses and creating images of information as described above with reference to FIG. 1 through FIG. 4B may improve (e.g., increase the efficiency of) the operation and performance of apparatus 100 in comparison with some conventional techniques. For example, some conventional techniques may copy information stored in a memory device from one location to another location when an image of host data is created. Plus, some conventional techniques may need to maintain a cache version of some information (e.g., information that may not have been moved out of the cache) while an image of host data is created. These operations associated with some conventional techniques may be time consuming, may employ complicated information management, or both. In memory device 101, managing logical addresses and creating an image of host data, as described above with reference to FIG. 1 through FIG. 4B, may be performed without copying information from one location to another location and without maintaining a cache version of information. This allows control unit 130 to be more efficient, less complicated information management, or both, relative to some conventional techniques.

Figure 5A:
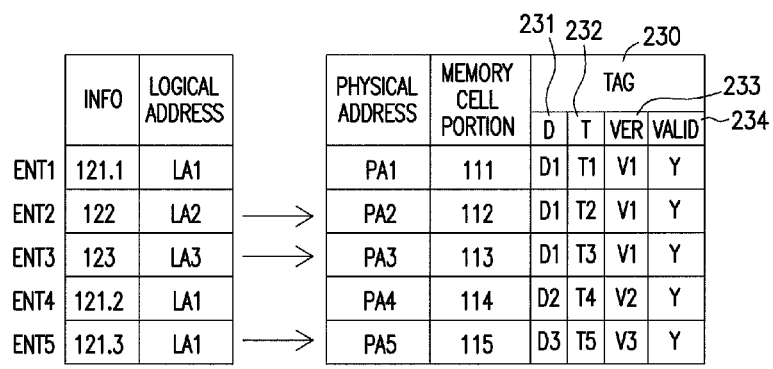
FIG. 5A and FIG. 5B show content of a record in a control unit in the memory device of FIG. 1 before and after some information is indicated as invalid, according to some embodiments described herein.
Figure 5B:
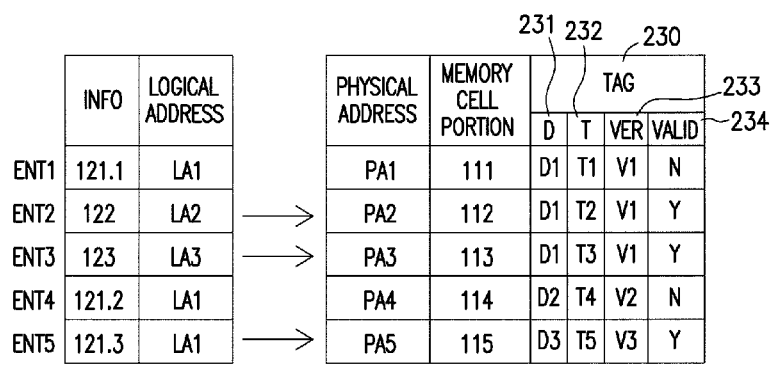

FIG. 5A and FIG. 5B show content of record 150 of FIG. 1 before and after some information is indicated as invalid, according to some embodiments described herein. As shown in FIG. 5A, information 121.1, 122, 123, 121.2, and 121.3 associated with corresponding entries ENT1, ENT2, ENT3, ENT4, and ENT5 in record 150 are valid information (e.g., as indicated by value Y). In FIG. 5B, information 121.1 and 121.2 associated with corresponding entries ENT1 and ENT 4 may be indicated (e.g., marked) as being invalid (e.g., indicated by value N).

In the examples of FIG. 5A and FIG. 5B, control unit 130 may change value Y associated with information 121.1 and 121.2 (FIG. 5A) to value N (FIG. 5B) to invalidate information 121.1 and 121.2 (e.g., to mark information 121.1 and 121.2 as being invalid). Information 121.1 and 121.2 may be invalidated if they are no longer needed by host 102 and control unit 130.

In some arrangements, host 102 determines whether a particular information is to be invalidated and then sends a command to control unit 130 to inform control unit 130 to invalidate that particular information. For example, in the example of FIG. 5B, host controller 165 of host 102 may send a command to control unit 130 to inform control unit 130 to invalidate information 121.1 and 121.2.

In some arrangements, control unit 130 may invalidate particular information (e.g., 121.1 and 121.2 in FIG. 5B) only if host 102 indicates that such particular information (121.1 and 121.2) are to be invalidated. Thus, in some arrangements, control unit 130 may not invalidate particular information (e.g., 121.1 and 121.2 in FIG. 5B) if host 102 does not indicate that such particular information are to be invalidated.

In FIG. 5B, after being indicated as invalid, information 121.1 and 121.2 can be deleted (e.g., in an erase operation) from portions 111 and 114, respectively. Then, portions 111 and 114 can be used to store new information.

Control unit 130 may be configured to perform a consolidation operation (e.g., a garbage collection operation) to consolidate information to improve (e.g., increase) storage capacity in memory cells 110 at a particular time. In a consolidation operation, control unit 130 may consolidate valid information (information indicated by value Y in FIG. 5A or 5B) from different locations (e.g., from non-contiguous locations) in memory cells 110 and move the consolidated information into another location (e.g., to a contiguous location) in memory cells 110. For example, control unit 130 may consolidate valid information from different memory blocks in memory cells 110 and move the consolidated information to the same memory cell block (or blocks) in memory cells 110. After valid information is consolidated, the consolidation operation may erase invalid (e.g., invalidated) information to make room for new information.

The consolidation operation of control unit 130 may refer to the content of record 150 to determine whether information stored in particular portions in memory cells 110 is to be preserved or deleted (e.g., erased). As shown in FIG. 5A, information 121.1, 122, 123, 121.2, and 121.3 are indicated as valid information. Thus, information 121.1, 122, 123, 121.2, and 121.3 are preserved. This means that by indicating information 121.1, 122, 123, 121.2, and 121.3 as being valid (e.g., to be preserved), control unit 130 also prevents the consolidation operation from invalidating information 121.1, 122, 123, 121.2, and 121.3. Thus, these information can remain valid after the consolidation operation.

At some point in time, some or all of information 121.1, 122, 123, 121.2, and 121.3 may be indicated as invalid by control unit 130. For example, as shown in FIG. 5B, information 121.1 and 121.2 may be indicated as invalid (e.g., indicated by value N). In this example, when a consolidation operation is performed, it may determine (e.g., by referring to record 150) that information 121.1 and 121.2 are invalid and are no longer preserved. Thus, the consolidation operation can delete (e.g., in an erase operation) information stored in portions 111 and 114. Then, portions 111 and 114 can be used to store new information.

Figure 6:
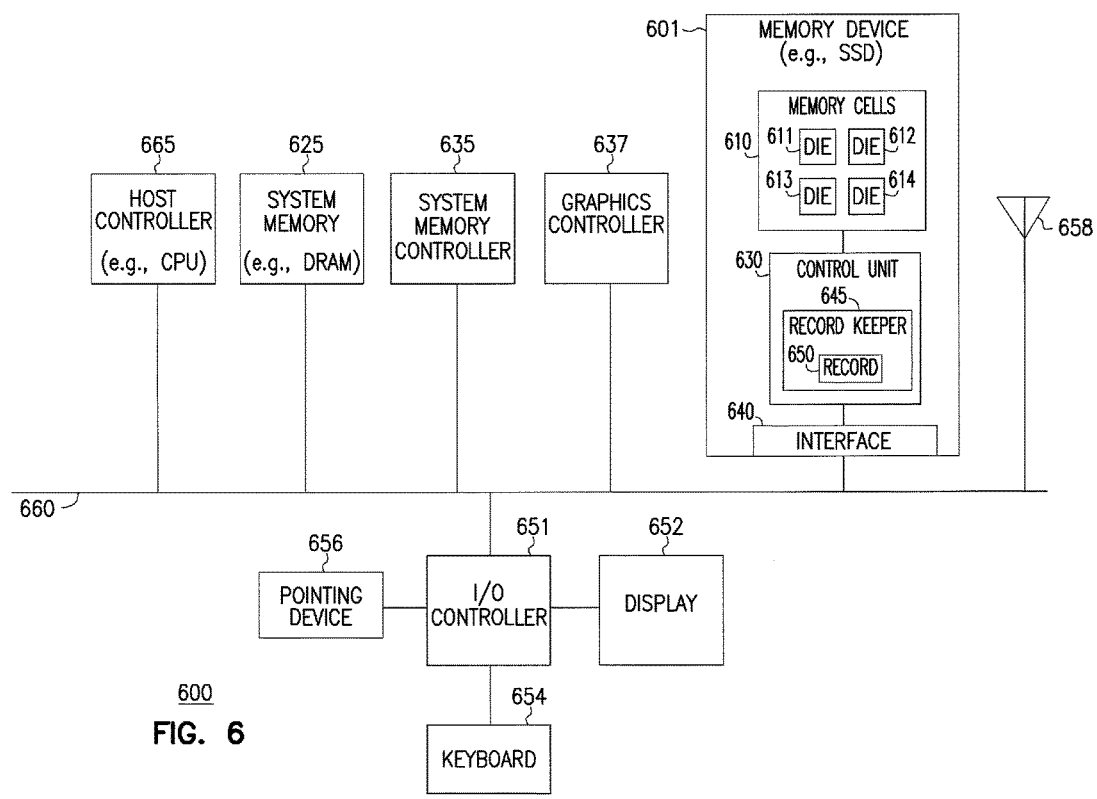
FIG. 6 shows a block diagram of an apparatus in the form of a system, according to some embodiments described herein.

FIG. 6 is a block diagram of an apparatus in the form of a system (e.g., electronic system) 600, according to some embodiments described herein. System 600 can include or be included in a computer, a memory storage system, or other types of electronic systems. As shown in FIG. 6, system 600 can include a memory device 601 (which can include an SSD), a host controller 665, a system memory 625, a system memory controller 635, a graphics controller 637, an input and output (I/O) controller 651, a display 652, a keyboard 654, a pointing device 656, at least one antenna 658, and a bus 660. Some of the components of system 600 (e.g., some of the components in FIG. 6, except memory device 601) can include or be included in a host, such as host 102 of FIG. 1.

As shown in FIG. 6, memory device 601 can include dice (e.g., semiconductor chips) 611, 612, 613, and 614 where memory cells 610 can be located. Memory device 601 can correspond to memory device 101 of FIG. 1. For example, memory cells 610 can correspond to memory cells 110 of FIG. 1, such that portions 111 through 115 (FIG. 1) can be included in only one die among dice 611, 612, 613, and 614 or included in multiple dice among dice 611, 612, 613, and 614. FIG. 6 shows memory device 601 including four dice 611, 612, 613, and 614 as an example. The number of dice in memory device 601 may vary.

Memory device 601 can include a control unit 630 and an interface 640, which can correspond to control unit 130 and interface 140, respectively, of memory device 101 of FIG. 1. As shown in FIG. 6, control unit 630 can be included in a die (e.g., a controller chip) separated from dice (e.g., memory chips) 611, 612, 613, and 614. Control unit 630 can include a record keeper 645 including a record 650. Record keeper 645 and a record 650 include content and operate in ways similar to, or the same as, record keeper 145 and a record 150 respectively, of control unit 130 of FIG. 1. Memory device 601 can be configured to operate in ways similar to, or the same as, memory device 101 of FIG. 1. Thus, control unit 630 can be configured to operate in ways similar to, or the same as, control unit 130 of FIG. 1.

Host controller 665 may include a central processing unit (CPU), which can be part of a general-purpose processor or part of an application specific integrated circuit (ASIC). Host controller 665 can correspond to host controller 165 of FIG. 1. Thus, host controller 665 can be configured to operate in ways similar to, or the same as, host controller 165 of FIG. 1.

System memory 625 may include a DRAM device, an SRAM device, a flash memory device, or a combination of these memory devices. I/O controller 651 can include a communication module for wired or wireless communication (e.g., communication through one or more antennas 658). Display 652 can include a liquid crystal display (LCD), a touchscreen (e.g., capacitive or resistive touchscreen), or another type of display. Pointing device 656 can include a mouse, a stylus, or another type of pointing device.

FIG. 6 shows the components of system 600 arranged separated from each other as an example. In some arrangements, two or more components of system 600 can be located on the same die (e.g., same chip).

System 600 may include or be included in a storage system (e.g., Redundant Array of Inexpensive Disks (RAID) system). The techniques described above (e.g., logical address history management and image (e.g., snap shot) creation) may be suitable for use in array logical volume manager (LVM) in a storage system, such as RAID system. For example, system 600 can include an LVM to manage information in system 600. When an image (e.g., snap shot) of information associated with particular logical addresses (or associated with the entire drive of particular logical addresses) in the storage system is needed by the LVM, the LVM can send a command (e.g., an image creation command) to control unit 630 to create such an image. In response to the command, control unit 630 can extract particular entries in record 650 of record keeper 645 to create the image requested by LVM based on the command. The operation of creating such an image is similar to or the same as those of control unit 130 and memory device 101 described above with reference to FIG. 1 through FIG. 5. In the example in FIG. 6, the LVM may be released from the operation of creating the image or may not directly operate to create the image. Control unit 630 may assume this duty, such as logical address history management and image creation. As mentioned above, logical address history management and image creation performed by a control unit (e.g., control unit 130 or 630) may improve the performance of the system (e.g., RAID system).

Management of logical address as described above may also be suitable for other applications, such as time-based file system version control, journaling the file system meta data (e.g., automatically tracking the file system journal), black box recording for aviation or for other applications, log history recording, video streaming applications where a long streaming history may be necessary and allow user access to over provisioning.

Figure 7:
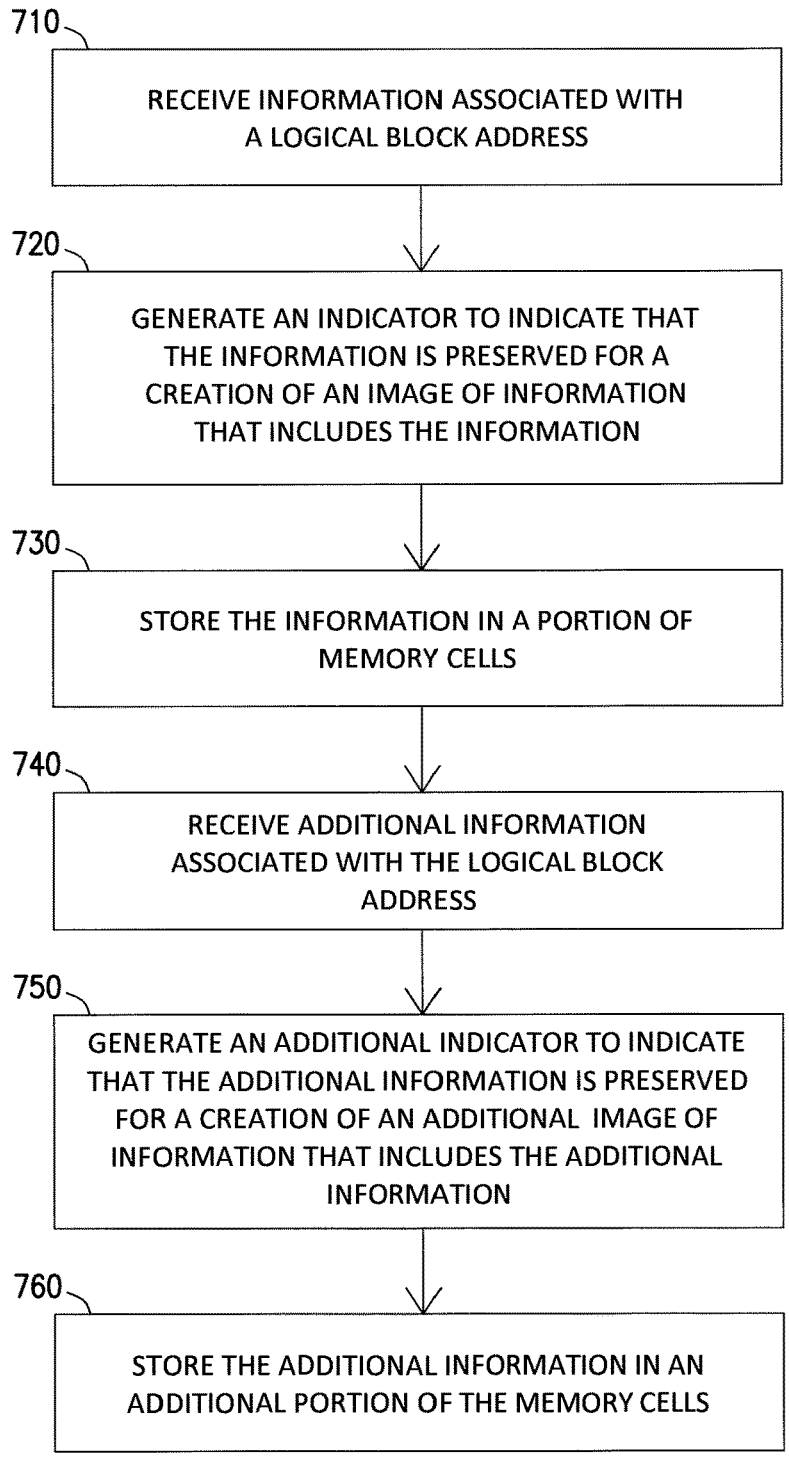
FIG. 7 is a flow diagram showing a method of managing logical address information and creating an image of information associated with the logical addresses, according to some embodiments described herein.

FIG. 7 is a flow diagram showing a method 700 of managing logical address information and creating an image of information associated with the logical addresses, according to some embodiments described herein. Method 700 can be performed by a memory device (memory device 101) described above with reference to FIG. 1 through FIG. 6. Some or all of the activities in method 700 can be implemented by software, firmware, hardware, or any combination of software, firmware, and hardware.

As shown in FIG. 7, method 700 can include activities 710, 720, 730, 740, and 750. Activity 710 can include receiving information associated with a logical block address. Activity 720 can include generating an indicator to indicate that the information is preserved for a creation of an image of information associated with logical block addresses at particular time. Activity 730 can include storing the information in a portion of memory cells (e.g., memory cells 110). Activity 740 can include receiving additional information associated with the logical block address. Activity 750 can include generating an indicator to indicate that the additional information is preserved for a creation of an additional image of information associated with logical block addresses at another particular time. Activity 760 can include storing the additional information in an additional portion of the memory cells. Activities 710, 720, 730, 740, and 750 may not be performed in the order (e.g., sequence) shown in FIG. 7.

In method 700, the information, the logical address, additional information, and the additional logical address may be provided by a host controller of a host (e.g., host controller 165 or 665) and received by a control unit of a memory device (e.g., control unit 130 or 630). Storing the information and the additional information and generating the indicators may be performed by the control unit.

Method 700 can include additional activities described above with reference to FIG. 1 through FIG. 6, such as activities and operations of apparatus 100 (including operations of memory device 101 and host 102) and operations of system 600 (including operations of memory device 601 and host controller 665).

The illustrations of the apparatuses (e.g., apparatus 100 and system 600) and methods (e.g., method 700 and operations performed by apparatus 100 and system 600) are intended to provide a general understanding of the structure of various embodiments and are not intended to provide a complete description of all the elements and features of an apparatus that might make use of the structures described herein.

The apparatuses (e.g., apparatus 100 and system 600) described above can include or be included in high-speed computers, communication and signal processing circuitry, single- or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The embodiments described above with reference to FIG. 1 through FIG. 4 include apparatuses and methods having an interface to communicate with a host, memory cells, and a control unit coupled to the interface to associate a portion of the memory cells with a logical address range based on control information provided to the interface from the host. The control unit is configured to cause the portion of the memory cells to operate in a configuration mode indicated by the control information from the host. Each memory cell in the portion of the memory cells is operable to store at most one bit of information if the configuration mode is a first configuration mode and to store more than one bit of information if the configuration mode is a second configuration mode. Other embodiments, including additional apparatuses and methods, are described.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description.

What is claimed is:

1. An apparatus comprising:
memory cells; and
a control unit coupled to an interface, the interface including a connector to couple to a host through a connection, the interface including circuitry to receive first information and second information, the control unit to store the first information in a first portion of the memory cells and to generate a first entry associated with the first information, the information associated with a logical address recognized by the host, the host including a host controller, the entry including an indicator indicating that the first information is to be preserved for a creation of an image of information associated with logical addresses in a logical address space recognized by the host;
the control unit to store the second information in a second portion of the memory cells after the first information is stored in the first portion of the memory cells, and to generate a second entry associated with the second information, wherein the second information is associated the same logical address as the first information, and the image of the first information is request by the host after the second information is stored; and
the control unit is configured to invalidate the first information if the host controller of the host sends a command to indicate that the first information is to be invalidated, wherein control unit is configured to perform an operation to consolidate the first information and the second information, and the first information stored in the first portion of the memory cells and the second information stored in the second portion of the memory cells remain valid after the operation until the host controller indicates that the first information stored in the first portion of the memory cells and the second information stored in the second portion of the memory cells are invalid.

2. The apparatus of claim 1, wherein the additional entry includes an additional indicator indicating that the second information is to be preserved for a creation of an additional image of information associated with the logical addresses in the logical address space recognized by the host.

3. The apparatus of claim 2, wherein the first information stored in the first portion of the memory cells and the second information stored in the second portion of the memory cells are different information.

4. The apparatus of claim 1, wherein the control unit does not invalidate the first information stored in the first portion of the memory cells if the host does not indicate that the first information is to be invalidated.

5. The apparatus of claim 1, wherein the entry associated with the first information stored in the first portion of the memory cells includes at least one indicator to indicate a time and a date when the first information is stored.

6. The apparatus of claim 1, wherein the entry associated with the first information stored in the first portion of the memory cells includes an additional indicator to indicate a version number of the information.

7. The apparatus of claim 1, wherein the logical address includes a logical block address.

8. A method comprising:
receiving, performed by a memory device, first information associated with a logical block address;
generating, performed by the memory device, a first indicator to indicate that the first information is preserved for a creation of a first image of information that includes the first information, the first information associated with a logical address recognized by a host, the host including a host controller;
storing, performed by the memory device, the first information in a first portion of memory cells;
receiving, performed by the memory device, second information associated with the logical block address associated with the first information;
generating, performed by the memory device, a second indicator to indicate that the second information is preserved for a creation of a second image of information including the second information;
storing, performed by the memory device, the second information in a second portion of the memory cells after the first information is stored, wherein the second information is associated the same logical address as the first information, and the first image of information excludes the second information;
invalidating, performed by the memory device, the first information in response to a controller host if the host sending sends a command to indicate that the first information is to be invalidated; and
performing a consolidation operation to consolidate information stored in the memory cells without invalidating the first and second information, wherein the first information stored in the first portion of the memory cells and the second information stored in the second portion of the memory cells remain valid after the consolidation operation until the host indicates that the first information stored in the first portion of the memory cells and the second information stored in the second portion of the memory cells are invalid.

9. The method of claim 8, wherein the second image of information includes the first information and the second information.

10. The method of claim 8, further comprising:
receiving a command from a host to create the first image of the information.

11. The method of claim 10, further comprising:
receiving a command from the host to create the second image of the information.

* * * * *